Nov. 18, 1930.  O. M. McGUIRE  1,781,952
BEET HARVESTER
Filed April 5, 1928   2 Sheets-Sheet 1
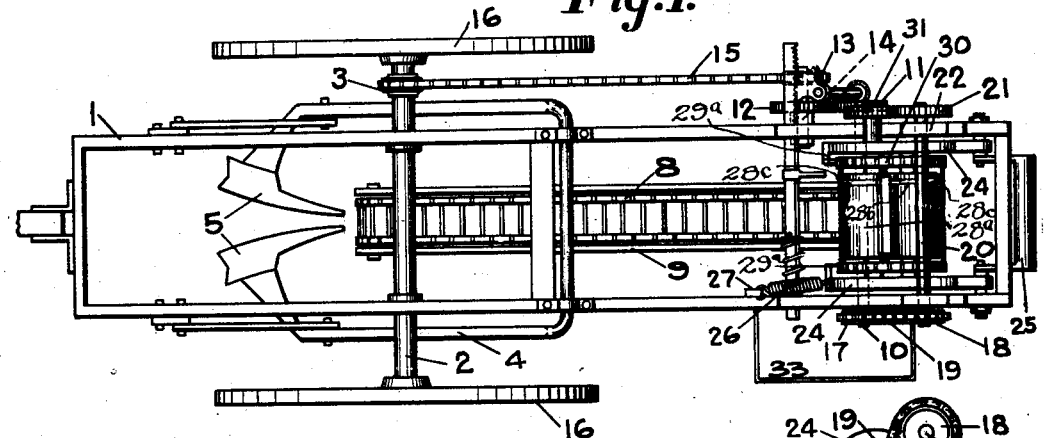
Fig.1.
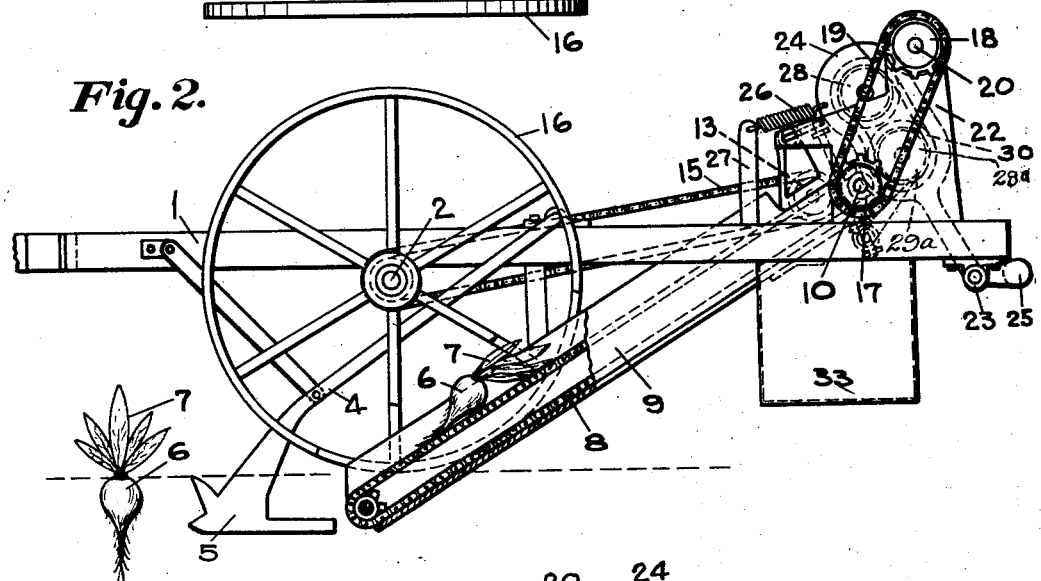
Fig.2.
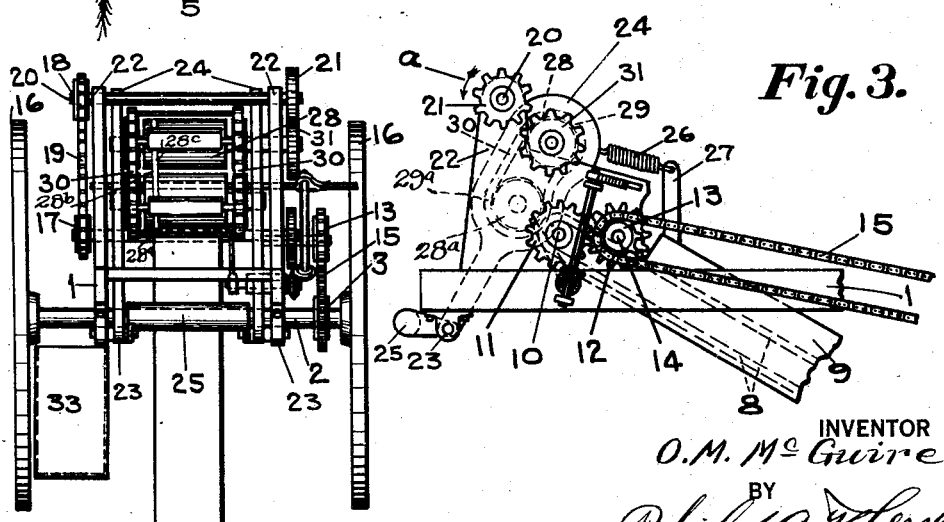
Fig.3.
Fig.4.
INVENTOR
O. M. McGuire
BY
Philip A. Ferrell
ATTORNEY Nov. 18, 1930.  O. M. McGUIRE  1,781,952
BEET HARVESTER
Filed April 5, 1928    2 Sheets-Sheet 2
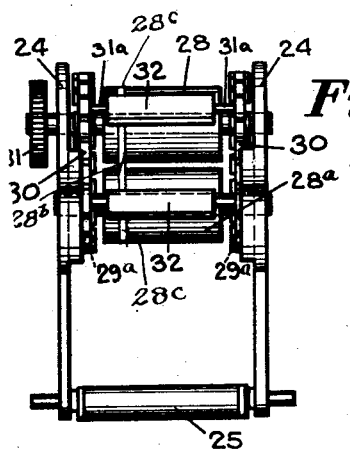
Fig. 5.
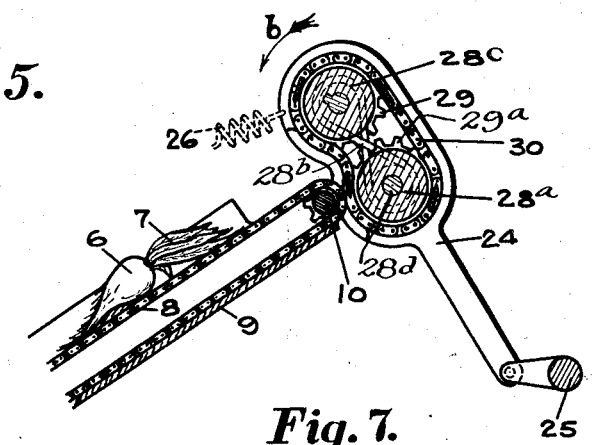
Fig. 7.
Fig. 6.
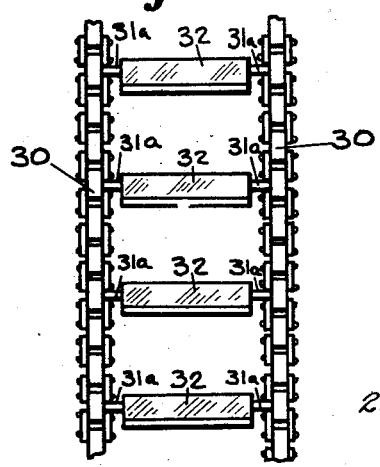
Fig. 8.
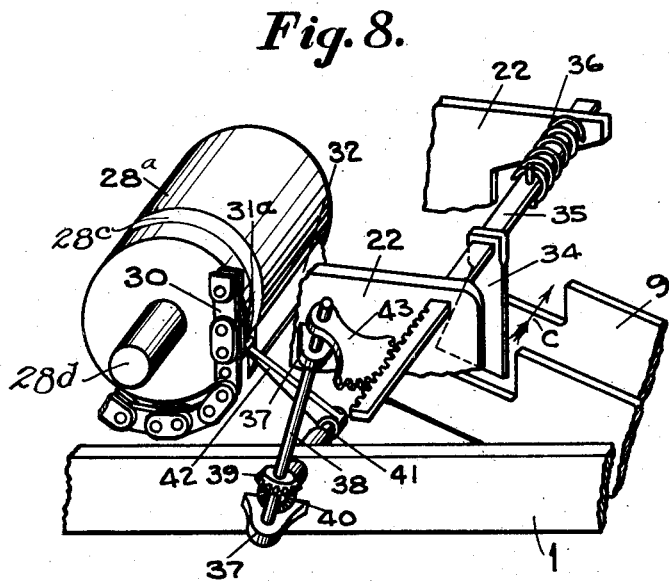
INVENTOR
O. M. McGuire
BY
Philip A. H. Ferrell
ATTORNEY Patented Nov. 18, 1930

1,781,952

UNITED STATES PATENT OFFICE

OTTIS M. McGUIRE, OF BRIDGEPORT, NEBRASKA

BEET HARVESTER

Application filed April 5, 1928. Serial No. 267,642.

The invention relates to beet harvesters and has for its object to provide a device of this character wherein digging elements engage under the beets and discharge the same onto an upwardly and rearwardly extending conveyor with their tops rearwardly disposed, severing means at the rear end of the conveyor and set in motion by the beets whereby their tops are severed and discharged rearwardly of the machine and means actuated by the severing mechanism for discharging the topped beets to the side of the conveyor into a receptacle.

A further object is to provide driving connections between the ground engaging wheels and the mechanisms whereby the entire device can be driven and operated from a single source.

A further object is to pivotally mount the severing mechanism frame at the rear of the conveyor, and position the same in relation to conveyor whereby the tops of beets will pass between the rollers of the severing mechanism and the momentum of the beets engaging the rollers will pivotally move the severing mechanism against spring action into driving connection with a constantly driven gear.

A further object is to provide the severing mechanism with endless sprocket chains having connecting blades horizontally and transversely disposed and which blades move downwardly for severing the tops from the beets and beet discharging means controlled by the knives after the top severing operation for discharging the severed beet transversely from the upper end of the conveyor.

A further object is to provide a beet discharging mechanism comprising a transversely disposed rack having a depending beet engaging member adjacent the severing mechanism, spring means for maintaining the beet engaging member to one side of the conveyor and cooperating with the rack, a rock shaft, gear and shaft connections between the rock shaft and the rack bar and an arm carried by the rock shaft in the path of the pintles of the severing knives whereby after a beet top severing operation, the severed beet will be transversely discharged from the conveyor by the beet engaging member.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawings:

Figure 1 is a top plan view of the beet harvester.

Figure 2 is a side elevation of the beet harvester, parts being broken away to better show the structure.

Figure 3 is a side elevation of the severing mechanism, showing the driving mechanism therefor.

Figure 4 is a rear elevation of the machine.

Figure 5 is an enlarged front elevation of the severing mechanism.

Figure 6 is an enlarged front elevation of the severing knives and sprocket chains.

Figure 7 is a vertical longitudinal sectional view through the severing mechanism and the rear end of the elevating conveyor.

Figure 8 is a perspective view of the beet discharging mechanism.

Referring to the drawings, the numeral 1 designates the frame of the harvester, which frame is provided with a transversely disposed rotatable axle 2, on which is mounted to rotate therewith a sprocket 3. Disposed below the frame 1 and supported by the bracket 4 are spaced digging elements 5, which are shaped and positioned whereby they will engage under the beet 6 when in the ground, force the same upwardly and rearwardly with its top 7 rearwardly disposed on the endless elevating conveyor 8 within the conveyor trough 9, as clearly shown in Figure 2 so that it will be elevated in this particular relation towards the topping mechanism hereinafter set forth. The endless conveyor 8 has the pintle 10 of its upper roller provided with a gear 11 which meshes with the gear 12 carried by the sprocket 13, and mounted on the stub shaft 14 on the side of the trough 9. Extending over the sprocket 13 and the sprocket 3 of the rotatable axle 2 is a sprocket chain 15, therefore it will be seen that when the ground engaging wheels 16 roll over the ground, as the machine advances, the endless conveyor 8 will be operated for elevating the beets.

The roller pintle 10 at the opposite side of the machine is provided with a sprocket 17 and extending around said sprocket and around a sprocket 18 is a sprocket chain 19, and which sprocket 18 is mounted on the transverse shaft 20, the outer end of which is provided with a gear 21, therefore it will be seen that as the machine advances the gear 21 is constantly rotated in the direction of the arrow $a$ shown in Figure 3. The shaft 20 is supported in the upwardly extending bracket plate 22 and remains constant in relation to adjacent mechanism at all times.

Pivotally connected to brackets 23 carried by the under side of the frame 1 is a cutter mechanism frame 24, which is adapted to swing backwardly and forwardly and is preferably provided with a counterweight 25, and with a coiled spring 26 connected thereto and to a bracket 27 for normally maintaining the cutter frame in forward inoperative position as shown in Figure 3 and out of engagement with the drive gear 21. Rotatably mounted within the frame 24 are beet top gripping rollers 28 and 28$^a$ which rollers rotate in opposite direction incident to their crossed belt connection 28$^b$ at one end thereof, and which crossed belt connection extends through channels 28$^c$ in the rollers 28 and 28$^a$ as shown in Figure 7. It will be seen that as the upper roller 28 rotates in the direction of the arrow $b$, the lower roller 28$^a$, which is rotatably mounted on the shaft 28$^b$, will rotate in an opposite direction for the beet top gripping operation. If so desired sprocket 29$^a$ or roller 28$^a$ or both said sprocket and roller may be loosely or idly mounted on shaft 28$^d$. Connected to the upper roller 28 and rotatable therewith is a sprocket 29, and rotatable on the shaft 28$^d$ independent of the roller 28$^a$ is a sprocket 29$^a$, over which the endless sprocket chains 30 extend. The rollers 28 and 28$^a$ are disposed adjacent the upper end of the endless conveyor 8 where they will be engaged by the beet 6 as it is projected or forced rearwardly by the endless conveyor with the tops 7 between the rollers and the momentum of the rearwardly projected beet rocks the cutter frame 24 on its pivotal point against the action of the spring 26, and throws the drive gear 31 carried by the upper roller 28 into mesh with the drive gear 21 which constantly rotates in the direction of the arrow $a$, therefore it will be seen that the rollers 28 and 28$^a$ will be simultaneously rotated by their crossed belt connection 28$^b$ for the beet top gripping operation and for imparting movement to the sprocket chains 30 in direction of the arrow $b$, Figure 7 by the rotation of sprockets 29 which rotate with the roller 28.

Rigidly connected in any suitable manner to opposite links of the sprocket chains 30 are the pintles 31$^a$ of cutter blades 32, which have their cutting edges downwardly disposed on the sides of the rollers adjacent the conveyor, therefore it will be seen that as the cutter blades 32 move downwardly they will sever the tops 7 from the beets, the action being a relatively quick one, as the spring 26 again pulls the frame 24 forwardly for moving the pivoted frame 24 to a position where the gears 31 and 21 will be out of mesh. After the top 7 is severed from the beet, it is discharged rearwardly by the rollers 28 on the ground to the rear of the machine, however it is obvious the beet, after the topping operation, will have to be removed from the upper end of the endless conveyor.

The beets are discharged to the side of the trough 9 into a receptacle 33 by means of a transversely movable depending plate 34 carried by the slidable rack bar 35 slidably mounted in bearings of the brackets 22 as shown in Figure 8, and which plate 34 moves in the direction of the arrow $c$, Figure 8 transversely across the upper end of the conveyor 8 against the action of the coiled spring 36. Rotatably mounted in brackets 37 at the side of the machine is a substantially vertically disposed shaft 38, the lower end of which is provided with a bevelled gear 39 which meshes with a bevelled gear 40 carried by a rock shaft 41, the inner end of which is provided with an arm 42, which extends into the path of the pintles 31$^a$ of the cutter blades 32 at one side of said blades, therefore it will be seen that as the cutter blades 32 complete the severing operation they will impart a partial rotation to the vertically disposed shaft 38, thereby rocking the gear segment 43 which meshes with the rack bar 35, consequently moving the rack bar and beet discharging member 34 transversely.

From the above it will be seen that a beet harvesting machine is provided wherein the beets are elevated, the tops passed between rollers, severed from the beets and the beets automatically moved transversely from the conveyor and discharged into a hopper at the side of the machine, and the beet tops will be deposited on the ground to the rear of the machine. It will also be seen that all of the mechanism is operated from a single source, that is from the ground engaging wheels, thereby obviating the use of several sources of power.

The invention having been set forth what is claimed as new and useful is:

1. The combination with the rear end of a beet harvester conveyor on which beets are carried with their tops rearwardly disposed, of a topping mechanism, said topping mechanism comprising a constantly driven gear, a pivoted frame adjacent said gear, top gripping rollers carried by said pivoted frame, sprockets at opposite ends of the rollers, the sprockets at the ends of one of the rollers rotating therewith, the other sprockets being idly mounted, a drive gear carried by one of said rollers, sprocket chains extending over said sprockets, severing knives carried by the sprocket chains and means for driving said conveyor at a speed whereby the topping mechanism will be pivotally moved incident to the momentum of the beets projected against the same whereby the roller carried gear will be moved into mesh with the constantly driven gear for imparting movement to the knives and simultaneously rotating the rollers for gripping beet tops.

2. The combination with a beet harvesting machine endless conveyor, of a pivoted topping mechanism adjacent said conveyor, a constantly driven gear adjacent the topping mechanism, means for normally maintaining the topping mechanism out of driving connection with the constantly rotated gear, said conveyor forming means whereby beets are projected against the topping mechanism for pivotally moving the same and forcing the topping mechanism into driving connection with the constantly rotated gear.

3. The combination with the rear discharge end of a beet harvesting machine conveyor, of a topping mechanism, said topping mechanism comprising a pivoted frame, spaced top gripping rollers rotatably mounted in said frame, driving connections between said rollers, whereby they will rotate in opposite directions, sprockets at opposite ends of the rollers, the sprockets at the ends of one of the rollers rotating therewith, endless sprocket chains extending over said sprockets at opposite ends of the rollers, transverse knives carried by said sprocket chains, a constantly rotated gear rearwardly of the frame, a gear carried by one of the gripping rollers in the path of the constantly rotated gear, spring means for normally maintaining said gears out of mesh, said pivoted frame being pivotally moved incident to the momentum of beets projected against the same whereby said gears are moved into driving connection, said spring means forming means whereby the gears are moved out of mesh after the topping operation.

4. The combination with the discharge end of a beet harvester conveyor, a topping mechanism adjacent said discharge end, said topping mechanism comprising spaced rollers, drive connection between the rollers whereby they will rotate in opposite directions, sprockets at the ends of the rollers, the sprockets at the ends of one of the rollers being rotatable with said roller, endless sprocket chains extending over said sprockets, transverse knives connecting the sprocket chains, means for intermittently operating the topping mechanism, of means for discharging beets transversely from the conveyor, said means being controlled by the knives.

5. The combination with the discharge end of a beet harvesting conveyor, a topping mechanism adjacent said discharge end, said topping mechanism comprising spaced rollers, drive connection between the rollers whereby they will rotate in opposite direction, sprockets at the ends of the rollers, the sprockets at the ends of one of the rollers being rotatable with said roller, endless sprocket chains extending over said sprockets, transverse knives connecting the sprocket chains, means for intermittently operating the topping mechanism, of means for discharging beets transversely from the conveyor, said means comprising a transversely disposed slidable rack bar, a depending beet engaging member carried by the rack bar and normally disposed to one side of the conveyor, a gear meshing with said rack bar and means controlled by the knives and cooperating with the gear whereby after a beet top severing operation said bar will be longitudinally moved.

6. The combination with the discharge end of a beet harvester, a beet topping mechanism adjacent said discharge end and having transversely disposed movable knives, of means for discharging beets to the side of the conveyor, said means comprising a transversely disposed rack bar slidably mounted, a depending beet engaging member carried by the rack bar adjacent one side of the conveyor, spring means for maintaining the rack bar and beet engaging member in inoperative position, a gear meshing with the rack bar, a shaft on which said gear is mounted, a rock shaft, gear connections between the rock shaft and the first mentioned shaft and an arm carried by the rock shaft in the path of the knives.

7. The combination with the discharge end of a beet harvester and topper conveyor, a topping mechanism adjacent the end of said conveyor, of a transversely movable beet engaging member above the conveyor, knives carried by the topping mechanism and downwardly movable for severing tops from beets, of means for moving the beet engaging member transversely, said means being controlled by the knives and spring means for returning the beet engaging member to initial position to one side of the conveyor.

In testimony whereof I hereunto affix my signature.

OTTIS M. McGUIRE.